US011561822B2

(12) United States Patent
Ou et al.

(10) Patent No.: US 11,561,822 B2
(45) Date of Patent: Jan. 24, 2023

(54) TASK SHIFTING BETWEEN COMPUTING DEVICES

(71) Applicant: Citrix Systems, Inc., Fort Lauderdale, FL (US)

(72) Inventors: Yuran Ou, Nanjing (CN); Fenghua Jie, Nanjing (CN)

( * ) Notice: Subject to any disclaimer, the term of this patent is extended or adjusted under 35 U.S.C. 154(b) by 0 days.

(21) Appl. No.: 16/889,116

(22) Filed: Jun. 1, 2020

(65) Prior Publication Data
US 2021/0349753 A1 Nov. 11, 2021

Related U.S. Application Data

(63) Continuation of application No. PCT/CN2020/089022, filed on May 7, 2020.

(51) Int. Cl.
G06F 9/48 (2006.01)
G06F 11/30 (2006.01)
G06F 11/34 (2006.01)

(52) U.S. Cl.
CPC ........ G06F 9/4856 (2013.01); G06F 11/3006 (2013.01); G06F 11/3495 (2013.01)

(58) Field of Classification Search
CPC .............................. G06F 9/4856; G06F 11/3495
See application file for complete search history.

(56) References Cited

U.S. PATENT DOCUMENTS

| 6,621,505 | B1 * | 9/2003 | Beauchamp | ........... | G06Q 10/10 715/700 |
| 8,553,625 | B2 * | 10/2013 | Shao | ................. | H04M 1/72412 370/310 |
| 8,595,041 | B2 * | 11/2013 | Schmidt | ............. | G06Q 10/0631 705/7.11 |
| 9,729,591 | B2 * | 8/2017 | Holmquist | .......... | G06F 3/04883 |
| 9,904,435 | B2 * | 2/2018 | Savage | ................ | G06Q 10/103 |
| 2003/0135565 | A1 * | 7/2003 | Estrada | .................. | G06Q 10/10 709/206 |
| 2008/0313281 | A1 * | 12/2008 | Scheidl | ................. | G06Q 10/06 709/205 |
| 2011/0209049 | A1 * | 8/2011 | Ghosh | .................... | G06Q 10/10 715/236 |

(Continued)

FOREIGN PATENT DOCUMENTS

CN 101576831 A 11/2009
CN 103780647 A 5/2014

(Continued)

OTHER PUBLICATIONS

PCT International Search Report and Written Opinion dated Feb. 4, 2021 for International Application No. PCT/CN2020/089022; 10 pages.

*Primary Examiner* — Jorge A Chu Joy-Davila

(57) ABSTRACT

In some embodiments, a method includes: displaying, on a first client device, a plurality of tasks; identifying, by the first client device, a task from the plurality of tasks, the task transferrable to a second client device in communication with the first client device; and sending, by the first client device, metadata for the task to the second client device in response to input received by the first client device, the task including metadata to allowing the second client device to display the task in the same manner as the task was displayed by the first client device.

18 Claims, 16 Drawing Sheets

(56) References Cited

U.S. PATENT DOCUMENTS

| | | | | |
|---|---|---|---|---|
| 2013/0091205 A1* | 4/2013 | Kotler | ............ | H04L 65/403 |
| | | | | 709/204 |
| 2013/0174237 A1* | 7/2013 | Zises | ............ | G06F 21/32 |
| | | | | 709/217 |
| 2014/0006972 A1* | 1/2014 | Celkonas | ............ | G06Q 10/107 |
| | | | | 715/753 |
| 2014/0372524 A1* | 12/2014 | Der | ............ | H04L 67/10 |
| | | | | 709/204 |
| 2016/0094592 A1* | 3/2016 | Koch | ............ | G06F 16/22 |
| | | | | 709/204 |
| 2016/0212208 A1 | 7/2016 | Kulkarni et al. | | |
| 2016/0226854 A1* | 8/2016 | Chen | ............ | G06Q 10/101 |
| 2016/0283285 A1* | 9/2016 | Balabhadrapatruni | ............ | |
| | | | | G06F 9/4843 |
| 2016/0378549 A1* | 12/2016 | Irish | ............ | H04L 67/1002 |
| | | | | 718/107 |
| 2018/0351895 A1* | 12/2018 | Rathod | ............ | A63F 13/655 |
| 2021/0232353 A1* | 7/2021 | Lee | ............ | G06F 3/1253 |

FOREIGN PATENT DOCUMENTS

| | | | |
|---|---|---|---|
| CN | 104410868 A | 3/2015 | |
| CN | 104461708 A | 3/2015 | |

\* cited by examiner

TASK SHIFTING BETWEEN COMPUTING DEVICES

CROSS-REFERENCE TO RELATED APPLICATIONS

This application is a continuation of and claims the benefit of PCT Patent Application No. PCT/CN2020/089022 filed on May 7, 2020 in the English language in the State Intellectual Property Office and designating the United States, the contents of which are hereby incorporated herein by reference in its entirety.

BACKGROUND

Various software applications and services allow tasks to be assigned to users. Over the course of a task's lifecycle, the task may be reassigned to different users, e.g., different users within the same company, enterprise, firm or other type of organization. For example, in project management software, a task (or "ticket") may be created by a project manager and initially assigned to a team leader, who in turn may in turn assign the task to a software engineer or developer. Once the developer has completed on the task, the developer may assign the task to a quality assurance (QA) engineer, and so on. Reassigning a task from one user to another is also referred to as "transferring" or "shifting" the task.

SUMMARY

Using existing systems and techniques, shifting tasks between users can be time consuming and inefficient. For example, if a first user wants to assign a task to a second user, the first user may be required to (1) search for the task from among a list of tasks, (2) search for the second user from a list of contacts, and (3) click/tap a series of buttons or other user interface (UI) controls. Existing approaches to task shifting can introduce inefficiencies into networked computer environments because they require user devices (e.g., devices belonging to the first and second users in the previous example) to communicate indirectly via a server. For example, the first user's device may send a reassignment request to the server and wait for an acknowledgement. In turn, the server may send a push notification or other type of message to the second user's device notifying of the reassignment. In such prior art systems, the second user is generally unaware that the task has been reassigned until after several client-server round trip times (RTTs), which can result in high latency and a poor user experience.

According to one aspect of the present disclosure, a method includes: displaying, on a first client device, a plurality of tasks; identifying, by the first client device, a task from the plurality of tasks, the task transferrable to a second client device in communication with the first client device; and sending, by the first client device, metadata for the task to the second client device in response to input received by the first client device, the metadata allowing the second client device to display the task in the same manner as the task was displayed by the first client device.

According to another aspect of the present disclosure, a method includes: establishing, by a second client device, a connection to a first client device, the connection enables the first client device to be in direct communication with the second client device; receiving, by the second client device, metadata from the first client device, the metadata allowing the second client device to display the task in the same manner as the task was displayed by the first client device; and displaying, by the second client device, the task in a task list using the received metadata.

According to another aspect of the present disclosure, an apparatus for use within a first client device includes a processor and a non-volatile memory storing computer program code. The code, when executed on the processor causes the processor to execute a process operable to: display a plurality of tasks; identify a task from the plurality of tasks that can be transferred to a second client device in communication with the first client device; and send a first request to the second client device to transfer the task to the second client device in response to input received by the first client device, the request including metadata to allow the second client device to display the task in the same manner as the task was displayed by the first client device.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
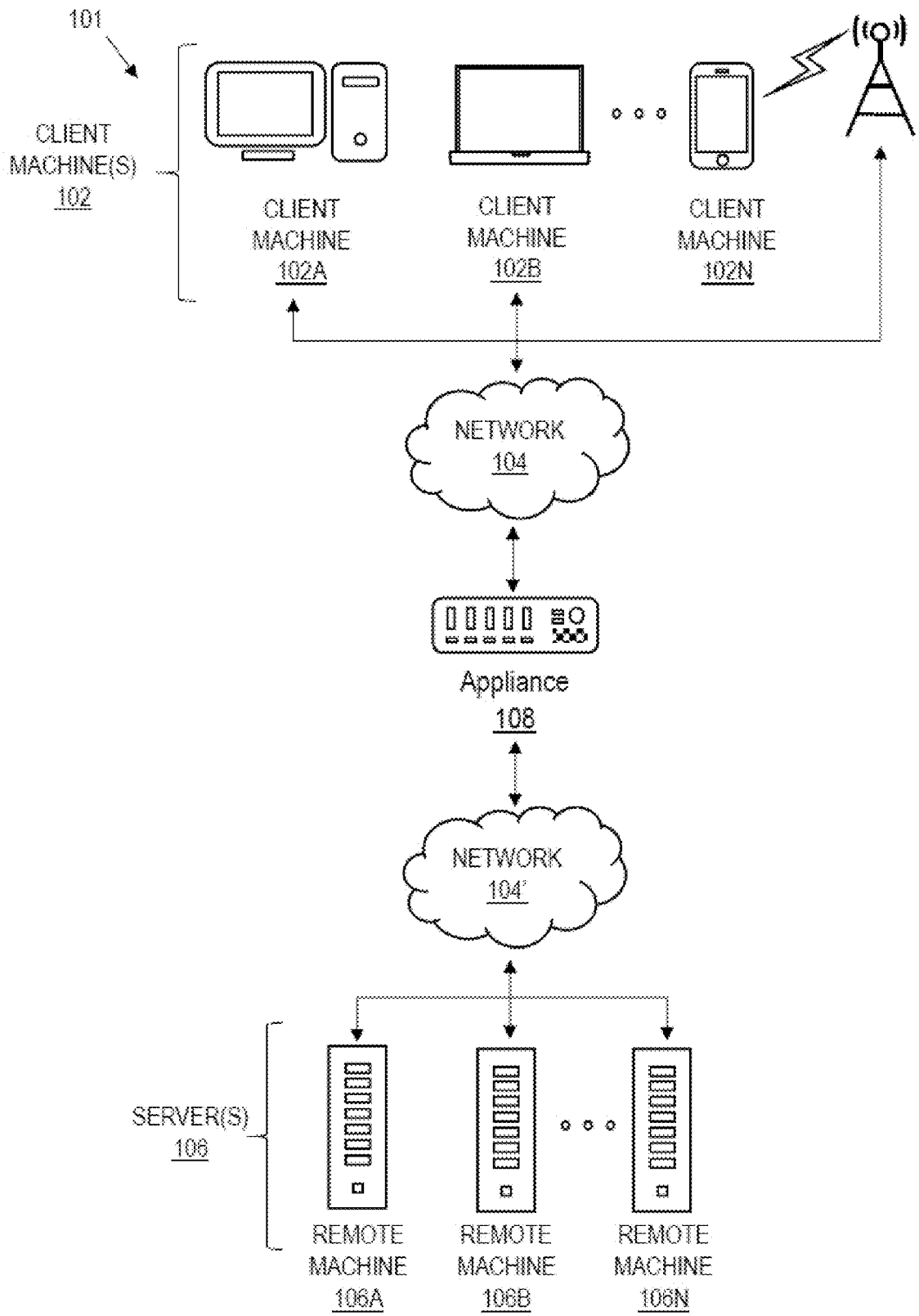
FIG. 1 is a diagram illustrating an example network environment of computing devices in which various aspects of the disclosure may be implemented, in accordance with some embodiments of the present disclosure.

Referring now to FIG. 1, shown is an example network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
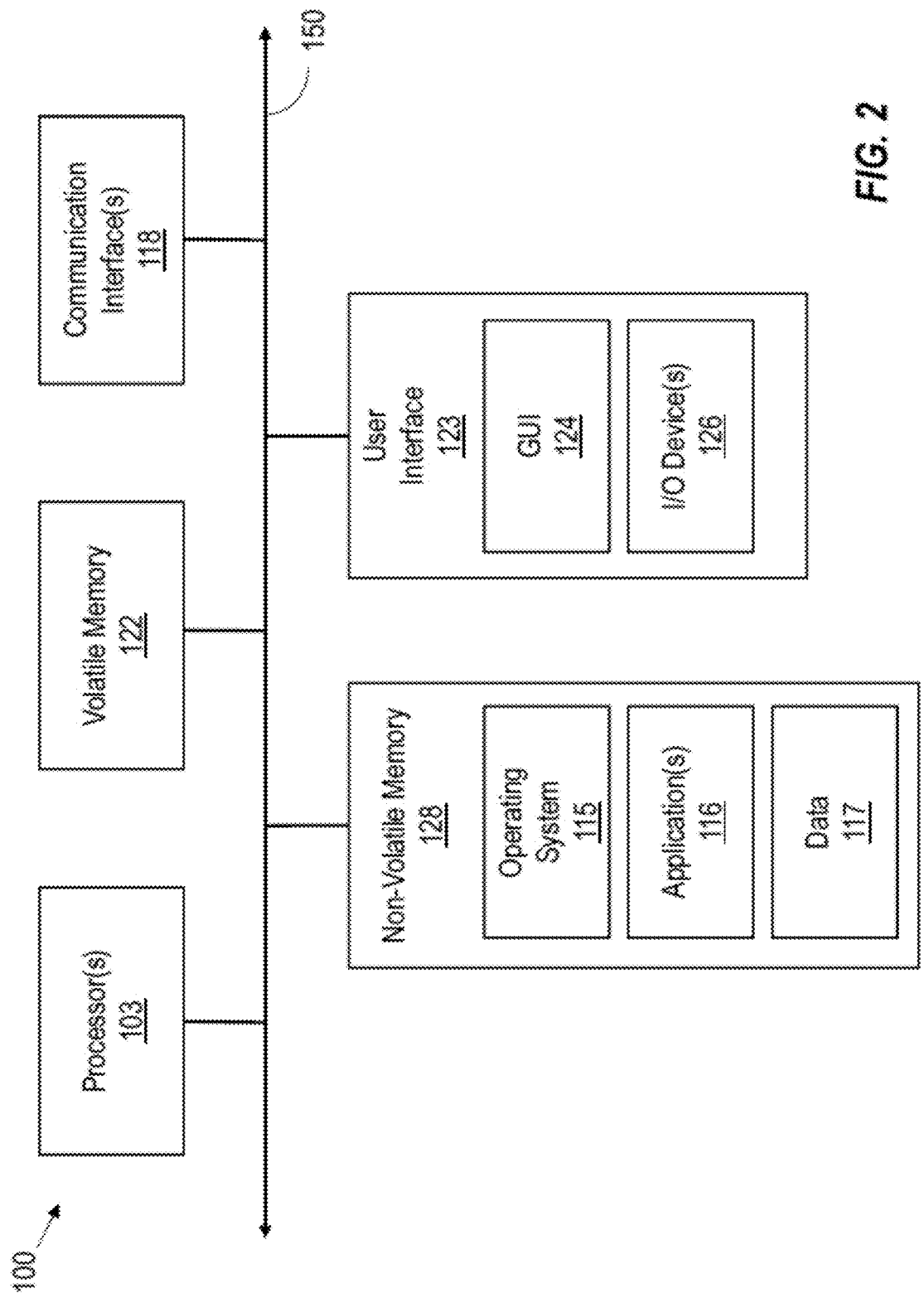
FIG. 2 is a block diagram illustrating selective components of an example computing device in which various aspects of the disclosure may be implemented, in accordance with some embodiments of the present disclosure.

FIG. 2 is a block diagram illustrating selective components of an example computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an example client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
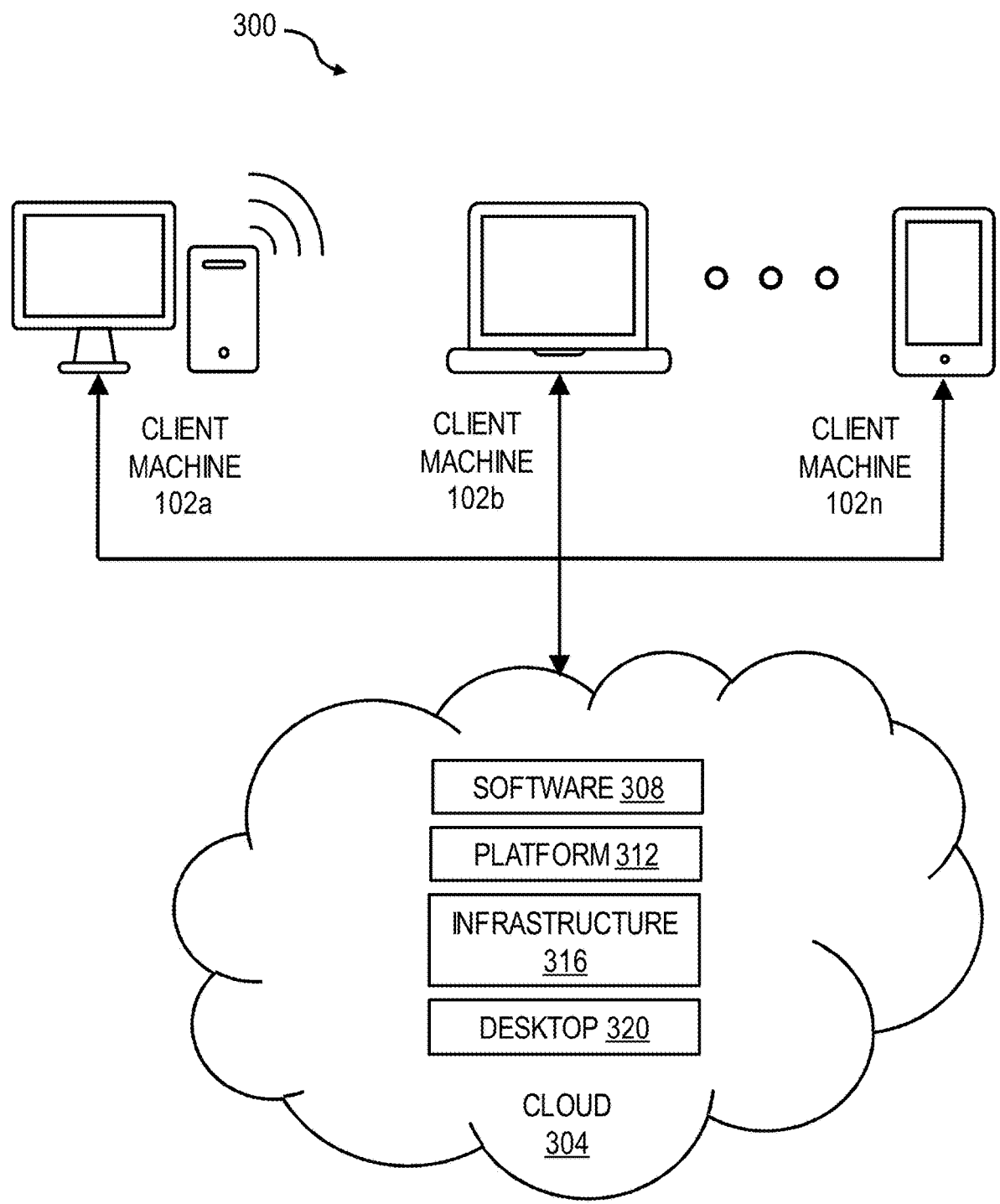
FIG. 3 is a diagram of a cloud computing environment in which various aspects of the concepts described herein may be implemented.

Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 102a-102n (such as those described above) are in communication with a cloud network 304. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 102. In some embodiments, the cloud computing environment 300 can include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
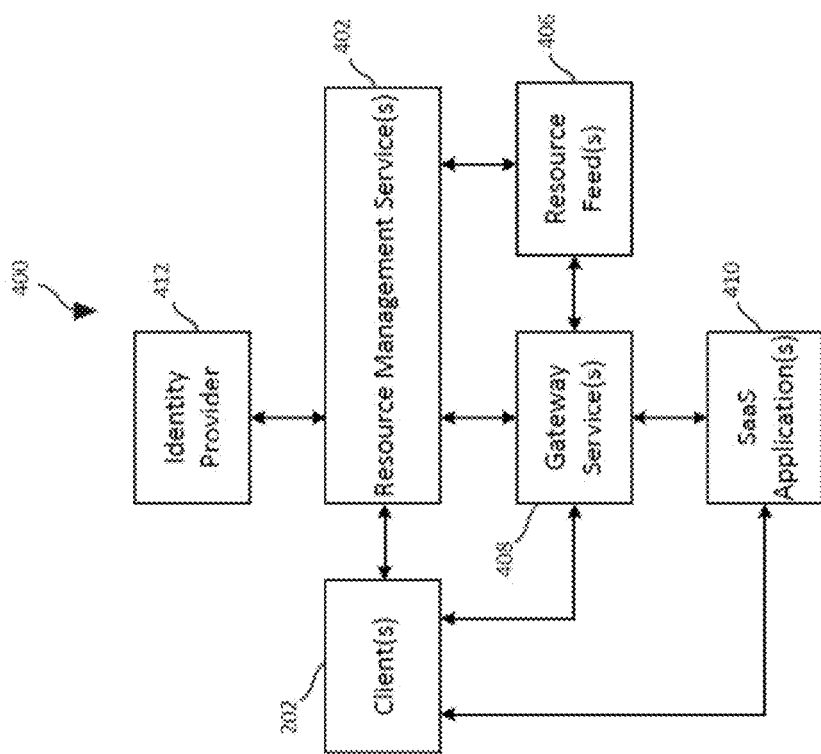
FIG. 4A is a block diagram of an illustrative system in which resource management services may manage and streamline access by clients to resource feeds (via one or more gateway services) and/or software-as-a-service (SaaS) applications.

FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
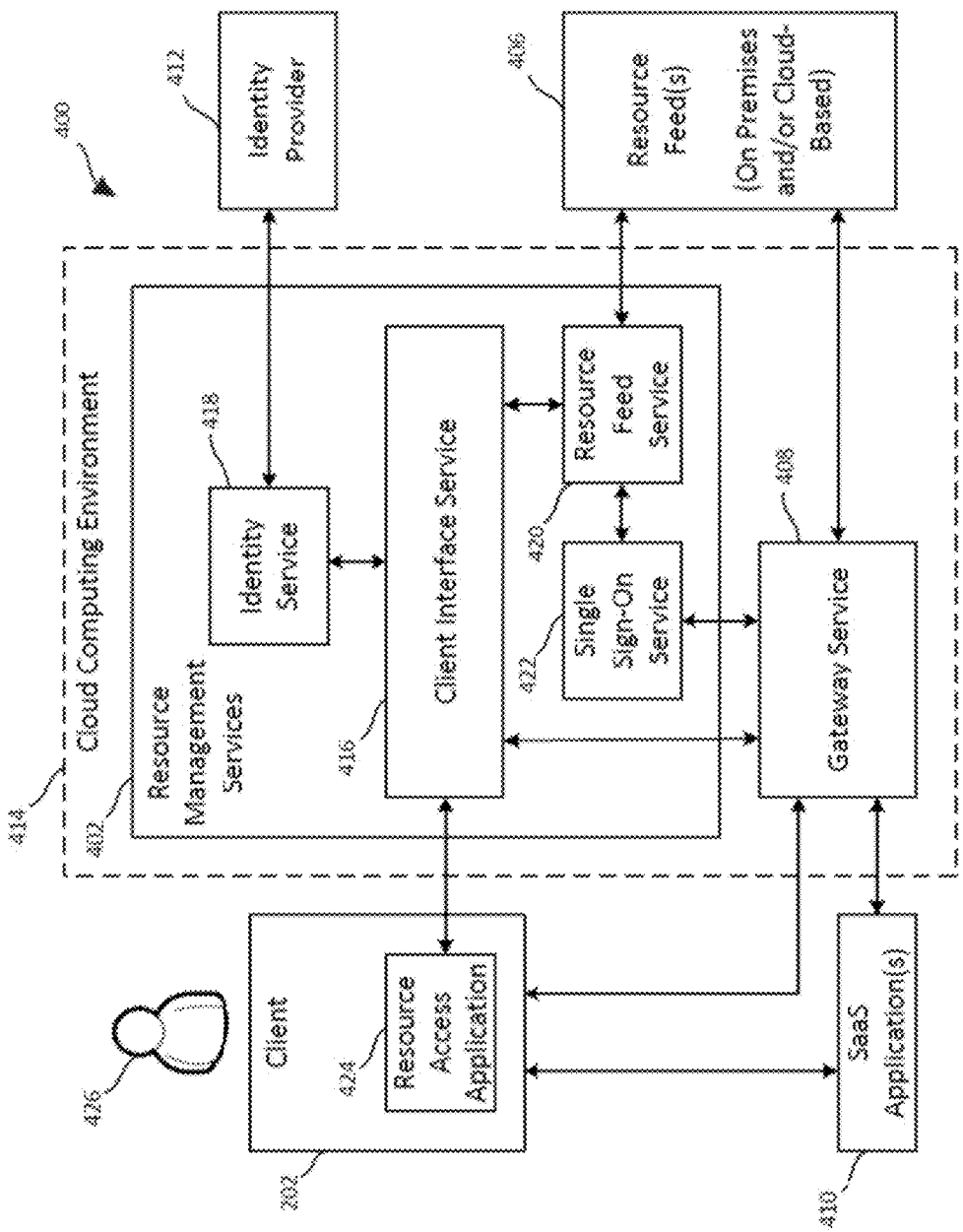
FIG. 4B is a block diagram showing an illustrative implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
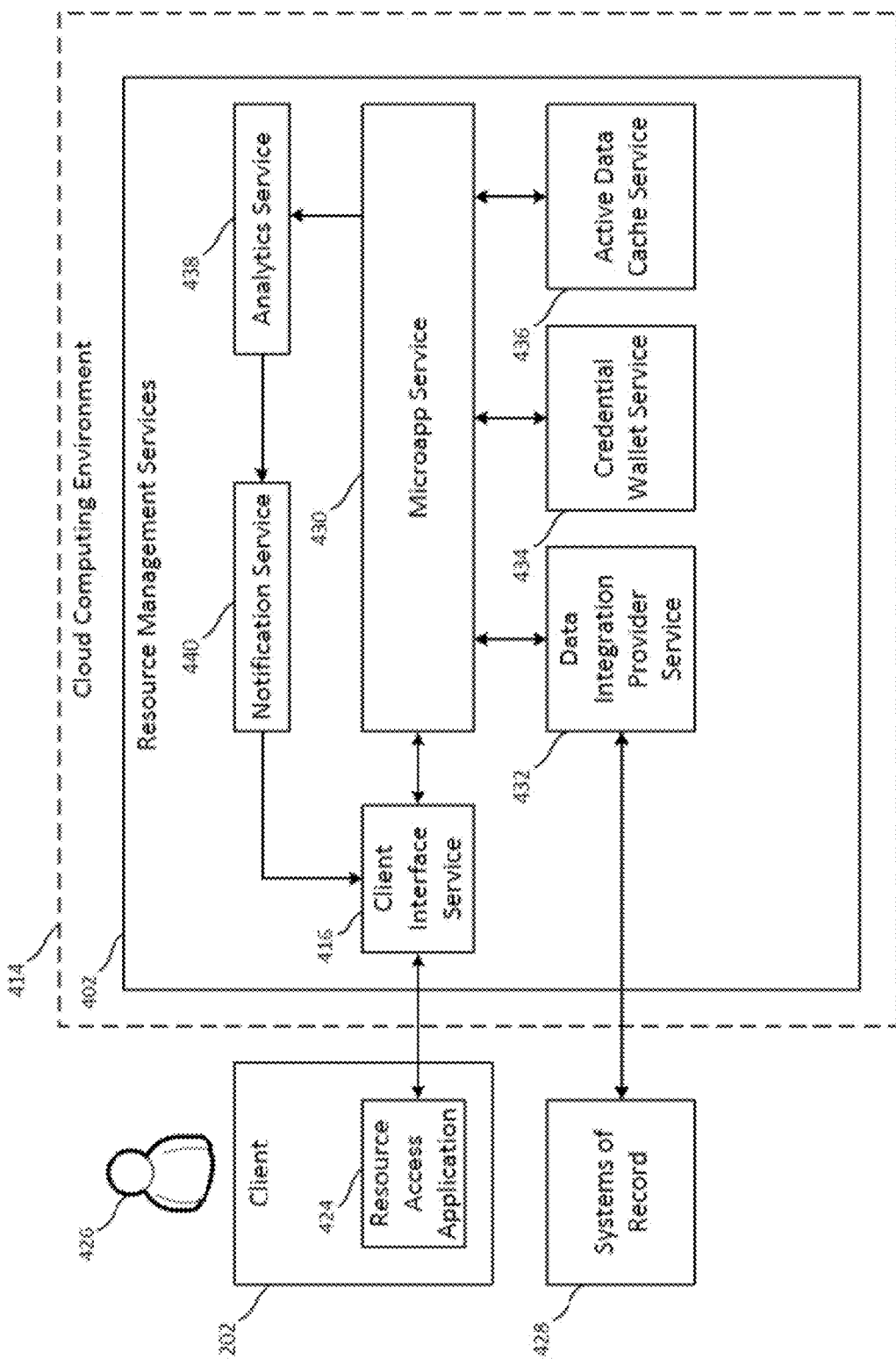
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6 ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 432 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information they're looking for.

Figure 5:
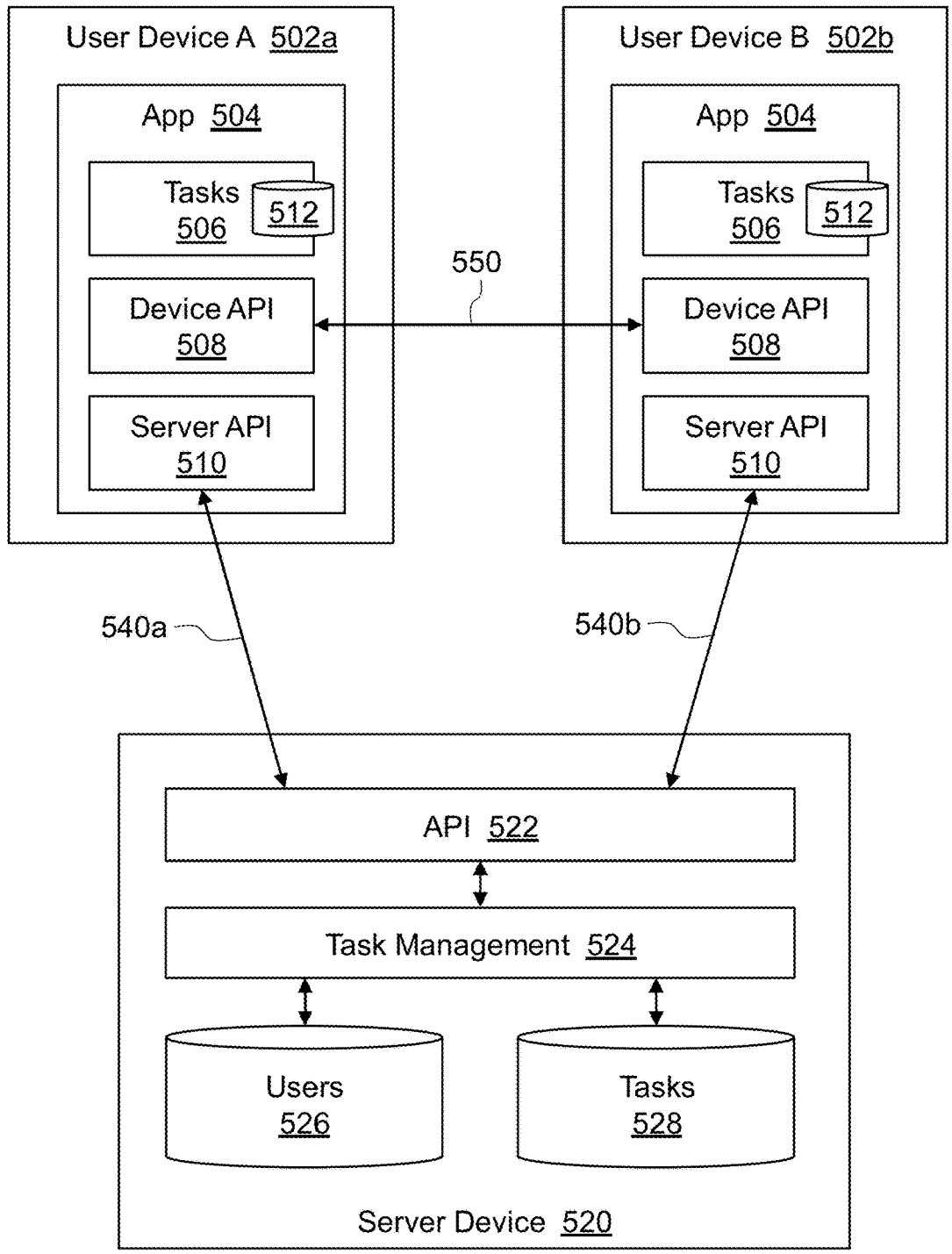
FIG. 5 is a block diagram of system in which tasks can be transferred between computing devices, in accordance with some embodiments of the present disclosure.

FIG. 5 shows an example of a system 500 in which tasks can be transferred, or "shifted," between devices (e.g., nearby devices), according to some embodiments. As used herein, a "task" can refer to any item that can be reassigned or transferred between different users, groups, or other entities as part of a workflow. Such workflows may impose rules as to when tasks can be reassigned, who can reassign those tasks, and/or to whom those tasks can be reassigned. The disclosed subject matter allows tasks to be transferred in a peer-to-peer (P2P) manner without disrupting existing workflows.

The illustrative system 500 includes a plurality of user devices 502a, 502b, etc. (502 generally) and a server device 520. User devices 502a, 502b, etc. (also referred to as "client devices") may be configured to communicate with the server device 520 via respective network paths 540a, 540b, etc. (540 generally). Network paths 540 can include one or more wireless links, wired links, or a combination thereof.

User devices (e.g., nearby user devices 502a and 502b) may be configured to communicate directly with each other via a peer-to-peer (P2P) link (e.g., link 550). In some embodiments, a P2P link 550 can include a Near-Field Communication (NFC), BLUETOOTH, P2P Wi-Fi, or 5G Device-to-Device (D2D) link. As used herein, the term "nearby" used in the context of computing devices refers to devices that are sufficiently close together such that they can establish a P2P link and communicate via the same. Because different P2P technologies may have different ranges, determining whether devices are "nearby" each other can depend on the type of P2P communication used in a particular embodiment. Although, for clarity, only two user devices 502a and 502b are shown in the example of FIG. 5, the disclosed subject matter can be applied to systems with other numbers of user devices 502.

In some embodiments, system 500 may form part a network environment, such as network environment 101 of FIG. 1. For example, user devices 502 of FIG. 5 may correspond to client machines 102 of FIG. 1, and server device 520 of FIG. 5 may correspond to one or more servers 106 of FIG. 1.

In some embodiments, system 500 may form part a cloud computing environment. For example, user devices 502 of FIG. 5 may correspond to client machines 102 of FIG. 3, and server device 520 of FIG. 5 may correspond to a virtual or physical server providing a cloud-based service, such as SaaS 308 of FIG. 3. As another example, user devices 502 of FIG. 5 may correspond to clients 202 of FIGS. 4A-4C, and server device 520 of FIG. 5 may correspond to a resource management service 402, a SaaS application 410, or a system of record 428 or some combination of these components shown and described in the context of FIGS. 4A-4C.

User devices 502 may include smartphones, tablets, laptops, desktops, workstations, or other types of user devices configured to install and run applications, or "apps." An illustrative app 504 may display tasks that are assigned to a user of the respective device 502 and allow the user to perform various types of actions on the tasks, including reassigning tasks to other users. Thus, app 504 is referred to herein as a "task-based" app. Non-limiting examples of task-based apps include project management apps, customer relationship management (CRM) apps, and expense management apps.

The task-based app 504 can include a tasks module 506, a device application programming interface (API) module 508, and a server API module 510. As used herein, the term "module" refers to a collection of hardware and/or software configured to perform and execute the processes, steps, or other functionality described in conjunction therewith. Tasks module 506 can be configured to display a list of tasks—e.g., tasks assigned to a user of the corresponding device 502—and to allow the user to perform actions on those tasks including reassigning tasks to other users. Device API module 508 may be configured to communicate directly with other user devices, such as nearby devices. For example, as shown in FIG. 5, device API module 508 of a first user device 502a can communicate with a second user device 502b via P2P link 550. Server API module 510 may be configured to send API requests to server device 520 via network paths 540, and to receive and process corresponding API responses from server device 520. Examples of API requests and responses that can be processed/generated by modules 508 and 510 are discussed below.

Server device 520 can include an API module 522, a task management module 524, a users database 526, and a tasks database 528. API module 522 can be configured to receive API requests from user devices 502, to process the requests using task management module 524, and to send responses back to the user devices 502. In some embodiments, API module 522 may be configured to send push notifications to user devices 502. Examples of requests, responses, and notifications that can be handled/generated by API module 522 are described hereinbelow. In some embodiments, API module 522 of server device 520 can interface with API modules 510 of user devices 502, such as illustrated in FIG. 5.

Tasks database 528 can be configured to store information about tasks accessible via task-based app 504. For a particular task, database 528 may store, for example, a unique task identifier ("task id"), a description of the task, one or more task groups with which the task is associated or otherwise assigned, and information identifying which user the task is currently assigned to. In some embodiments, tasks database 528 may store priority information for tasks. As used herein, the term "task group" refers to any logical grouping of tasks. For some task-based apps, task groups may be defined by an organization. For example, in the case of a project management app, task groups can include projects that the organization is engaged in. As another example, in the case of a CRM app, task groups can include the organization's business units responsible for serving customers. As another example, a task group can correspond to a team, group, or other divisional of the organization to which users can be assigned.

Users database 526 can be configured to store information about users of the task-based app 504. For example, for a particular user, database 526 may store the user's name, profile image, information identifying the user's organization, information describing which task groups the user is assigned to or otherwise associated with, and information describing the user's role or roles within the organization and/or task groups.

Task management module 524 may be configured to manage assignments of tasks (e.g., tasks defined within tasks database 528) to users (e.g., users defined within users database 526). Task management module 524 may implement and enforce one or more validation rules regarding which tasks can be assigned to which users, and when such assignments may occur. For example, task management module 524 may enforce that a task can only be assigned to users of a particular task group, e.g., users assigned to the same project or business unit as the task. As another example, task management module 524 may restrict which users can assign to which other users based on their respective roles, e.g., by allowing managers to assign tasks to staff, but not vice-versa. These illustrative validation rules are non-limiting and the particular validation rules used can vary by application, organization, etc.

Some or all of the validation rules implemented within task management module 524 may also be implemented and enforced within client app 504. In some embodiments, module 524 may implement at least one validation rule that is not implemented within client app 504. As discussed further below, in this situation it may be possible for a user device (e.g., device 502a) to shift a task to a nearby user device (e.g., 502b) and for server device 520 to reject the reassignment as invalid.

Referring again to user devices 502, in some embodiments, tasks module 506 can retrieve a list of tasks from server device 520, e.g., by sending a request via server API module 510. The task list may be displayed on the user device 502 along with UI controls for performing actions on particular tasks.

In some embodiments, task-based app 504 may correspond to a microapp accessible within a resource access application, such as resource access application 424 of FIGS. 4B and 4C. That is, a resource access application may be installed on user devices 502 and configured to execute various microapps, including task-based microapps, that can interface with an underlying SaaS applications or other resources. Thus, while FIG. 5 shows user devices 502 having a single task-based app 504 that communicates with a single server device 520, in some embodiments a user device 502 can have a plurality of apps or microapps configured to communicate with one or more different servers (e.g., different SaaS application servers).

In some embodiments, the tasks modules 506 may form a part of the resource access application 424 itself. Here, tasks module 506 may be configured to display a list of tasks that includes tasks from various different microapps. In this case, tasks module 506 may keep track of which application tasks are associated with, for example by storing or otherwise associating an app id with individual tasks in its task list. An "app id" can be any value that uniquely identifies a particular app or microapp from among the set of available apps/microapps available within the system 500.

When two or more user devices 502 are nearby each other, as with devices 502a and 502b in FIG. 5, tasks module 506 can enable a user to shift tasks to the nearby device using a simple UI gesture, such as a click, tap, or swipe, or other non-UI gestures, such as a quick movement or turn of the device or contact of devices. For example, in the case where a user device 502 is a smartphone, tablet, or other touch-screen-enabled device, tasks module 506 may allow its user to shift a task to a nearby device by swiping on the task in the task list. Wherein the present disclosure describes tasks as being shifted to user devices, this should be understood to mean that the tasks are shifted to corresponding users of said devices. Other UI gestures and controls can also be provided to allow tasks to be easily shifted to a nearby device. Thus, whereas existing systems require a user to perform several steps to transfer a task, the disclosed subject matter allows tasks to be transferred in a single step, or in relatively few steps. Example UIs that can be implemented within tasks module 506 are shown and described in the context of FIGS. 6A-6D and 7A-7C.

In certain examples given herein, the first user device 502a is described as shifting tasks to second user device 502b. It should be understood that task shifting can be bidirectional, i.e., second user device 502b could also shift tasks to first user device 502a according to the disclosed subject matter.

In some embodiments, tasks module 506 can identifying tasks from the task list of a device (e.g., device 502a) that can be shifted to the nearby device (e.g., device 502b). Based on this identification, tasks module 506 can allow certain tasks to be shifted while preventing other tasks from being shifted (e.g., by disabling or blocking a UI input on such tasks). In some embodiments, the identification of tasks can be based on validation logic similar to that described above as implemented within server task management module 524. For example, tasks module 506 can identify tasks of the same task group as the user of nearby device 502b (e.g., tasks of a given project to which the nearby user is assigned to work on). As another example, tasks module 506 may determine that the user of the first device 502a cannot reassign tasks to the user of the second device 502a based on their respective roles within the organization. Tasks module 506 can receive information about the user of nearby device 502b via the P2P link 550. For example, after P2P link 550 is established, nearby devices 502a and 502b may exchange user information, such as user names, profile images, user task groups, user role's, etc. Initially, the nearby devices 502a and 502b may receive information about the user of their own device from server device 520 (e.g., from users database 526).

In general, tasks module 506 can use task information received from server device 520 and user information received from server device 520 and/or nearby device 502b to identify transferable tasks. In some embodiments, server device 520 may explicitly inform the user device 502a which tasks can be transferred or not based on server-side validation logic. In some embodiments, server device 520 may provide, for a given task, a list of users or groups to whom the task can be reassigned. That is, server device 520 may "pre-approve" reassignment to particular users or groups of users according to its validation logic.

In the case where tasks module 506 is part of a resource access application 424 or otherwise configured to display tasks from multiple different apps/microapps, the identification of tasks can include determining which apps/microapps are available on the nearby device 502b and then identifying tasks from the task list of the available microapps. The nearby devices 502a and 502b can exchange information about available microapps via P2P link 550. For example, second user device 502b can transmit a list of its available app ids to first user device 502a, which can in turn compare the received list against the app ids in its task list to identify tasks that can be shifted to second device 502b.

In some embodiments, nearby devices 502a, 502b may authenticate each other before exchanging permitting P2P task shifting. For example, P2P link 550 may be established as a private communication channel by exchanging cryptographically secure certificates or signatures between the devices 502a, 502b. In some embodiments, user devices 502 may store or otherwise have access to a certificate, signed and granted by a trusted entity (e.g., resource management services 402 of FIG. 4B), that includes user information for that device. The nearby devices can exchange signed user information and validate the other's signatures before allowing task shifting.

In response to receiving user input to shift a task, tasks module 506 may send a request to nearby device 502b via device API module 508 and P2P link 550. The request may include metadata to allow the nearby, second device 502b to display the task in the same manner as the task was displayed by the first device 502a. In some embodiments, the metadata can include one or more of: app id, app name or title, app icon, task id, task title, task description, and a list of actions that can be performed on the task. It should be appreciated that the preceding list of metadata is merely illustrative and that the particular metadata transmitted to the nearby device can be selected based on the needs of a particular application, organization, etc.

In some embodiments, a request to shift a task may be include data formatted as JSON (JavaScript Object Notation). An example of JSON-formatted metadata is provided below.

```
{
    app_id: '123',
    app_title: 'ACME CRM',
    app_icon: 'acme.png',
    task_id: 'A',
    task_title: 'ISSUE A',
    task_description: 'Customer unable to login.',
    actions: [
        {name: 'Start'},
        {name: 'Done'}
    ]
}
```

Using the metadata received via P2P link 550, the second user device 502b can display the task in its task list, indicating that the task is now assigned to the user of the second device 502b. In more detail, tasks module 506 of second user device 502b can use the received metadata to update and display its task list to include the shifted task.

In addition to sending the shifted task's metadata to second device 502b, the first device 502a may send a request to server device 520 to reassign the task. For example, tasks modules 506 of first device 502a may send a request to the server via API module 510 and network path 540a. The request can be received by the server device's API module 522 and processed in turn by task management module 524. As discussed previously, tasks management module 524 may enforce validation rules regarding when and how tasks are assigned. Thus, using the validation rules, server device 520 can determine if reassignment is valid or invalid.

If the requested reassignment is valid, server device 520 can update the tasks database 528 to reflect the reassignment and send a push notification or other type of notification to second user device 502b that the task is now assigned thereto. The timing and nature of such notifications can vary depending on the underlying server implementation and/or workflow. For example, a particular SaaS application server may notify a user of reassigned tasks periodically or only when the task-based app restarts. In some embodiments, a server device 520 may be aware of P2P task shifting and, for efficiency, may avoid sending a notification to the second device 502b in the event P2P task shifting has already occurred.

The notification sent from server device 520 to second user device 502b can include the unique task id of the reassigned task, along with other task data. Second user device 502b can reconcile the received task id against its task list to determine if the reassignment notification is for (1) a task that was previously transferred directly from a nearby device and, as such, is already in second user device's task list, or (2) a task that was not previously transferred from a nearby device. In the first case, second user device 502b can link or merge the server data with the metadata previously received from nearby, first user device 502a. In the second case, the second user device 502b can add the task to its task list using the server data.

If the requested reassignment is invalid, server device 520 can send a response/notification to both the first device 502a and the second device 502b indicating that the reassignment was rejected. In response, the first device 502a can re-display the task in its task list and the second device 502b can remove the task from its task list. The tasks modules 506 can be configured to perform these steps.

In some embodiments, second user device 502b may receive the shifted task's metadata from first user device 502a before server device 520 receives a corresponding reassignment request from first user device 502a. For example, first user device 502a may intentionally delay sending the request to the server 520 until after the task has been shifted to nearby second user device 502b. This can ensure that the device-to-device communication is prioritized over the device-to-server communication in order to minimize the perceived user time it takes to shift a task. As another example, first user device 502a can send to both second user device 502b and server device 520 at approximately the same time, but second user device 502b receives first due to the relatively low latency of P2P link 550. In this situation, actions performed on the task by second user device 506b that are sent to the server device 520 may fail due to validation rules and/or a race condition with updating the tasks database 528. Thus, second user device 520b may wait to receive the reassignment notification (i.e., a "confirmation") from server device 520 before it sends any action requests to the server. In some embodiments, tasks module 506 allows the user to perform actions on unconfirmed tasks but, rather than executing the actions immediately, tasks module 506 may record the actions to storage 512. Tasks module 506 may execute, or "replay," the recorded actions after the reassignment is confirmed by server device 520.

It should be appreciated that disclosed embodiments can be used in combination with existing computer systems and services, such as with existing SaaS applications. For example, disclosed embodiments can be implemented within one or more user device modules, such as within tasks module 506 of FIG. 5, and may not require any changes to the corresponding server devices.

FIGS. 6A-6D show an illustrative UI 600 for shifting tasks to nearby devices, in accordance with some embodiments of the present disclosure. The UI 600 can be implemented within a task-based app executable on a user device, such as app 504 of FIG. 5. In more detail, UI 600 may be presented by first user device 502a when shifting a task to nearby, second user device 506b.

Figure 6A:
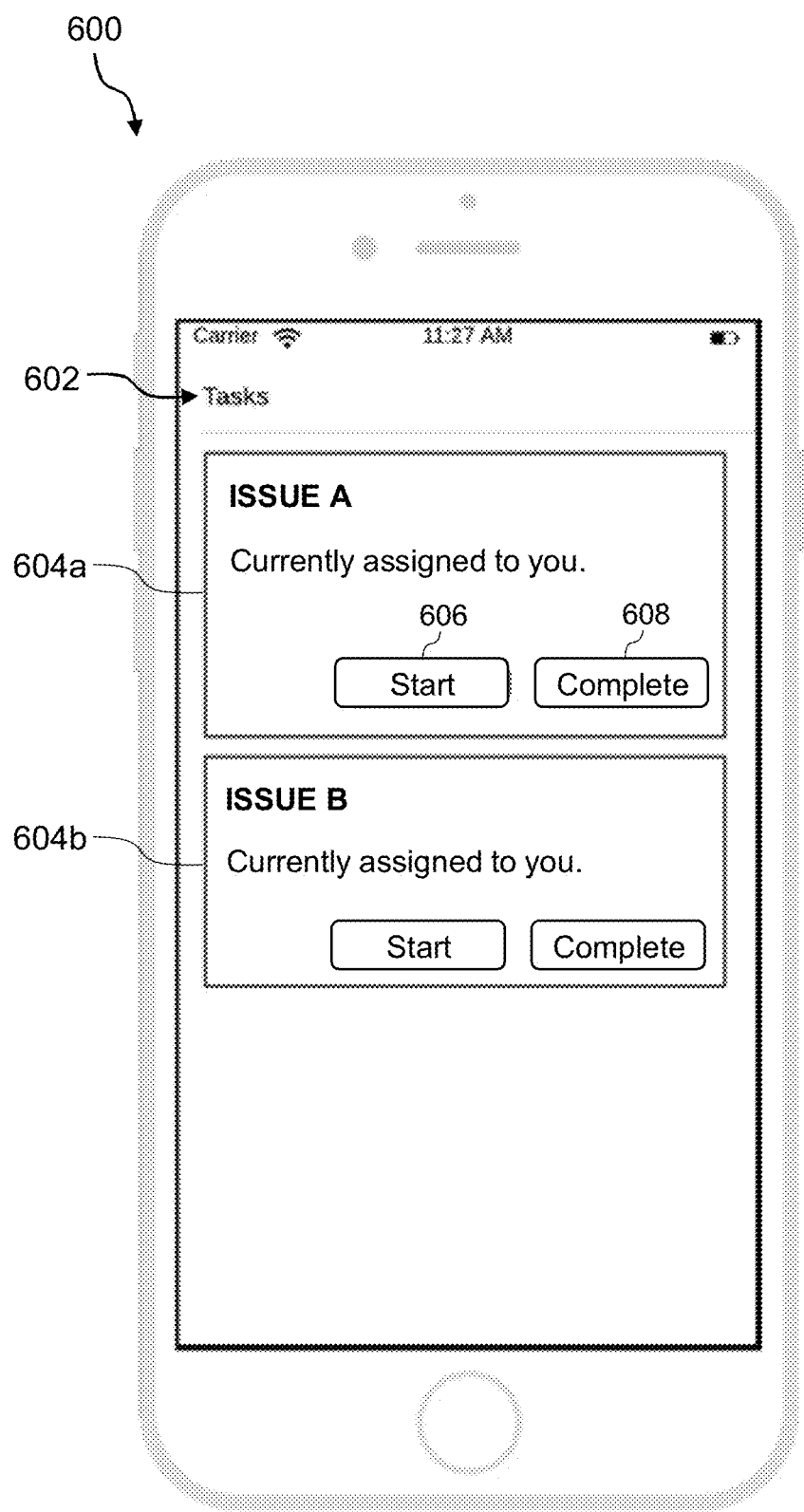
FIGS. 6A-6D show an illustrative user interface for shifting tasks to another computing device, in accordance with some embodiments of the present disclosure.

Referring to FIG. 6A, the UI 600 can include a task list 602 having one or more tasks 604a, 604b, etc. (604 generally). For clarity, only two tasks 604a and 604b are shown in FIG. 6A, however the disclosed subject matter can be applied to arbitrary numbers of tasks. For a given task, the UI 600 can include one or more UI controls representing actions that can be performed on the task. In the example of FIG. 6A, a first task 604a includes a first button 606 to "Start" the task and a second button 608 to "Complete" the task. In some embodiments, task list 602 may include tasks from one or more microapps within a resource access application, such as resource access application 424 of FIGS. 4B and 4C. Task list 602 may be populated using data received from one or more server devices, such as server device 520 of FIG. 5. For example, the server may return data for one or more tasks currently assigned to the device shown in FIG. 6A.

Figure 6B:
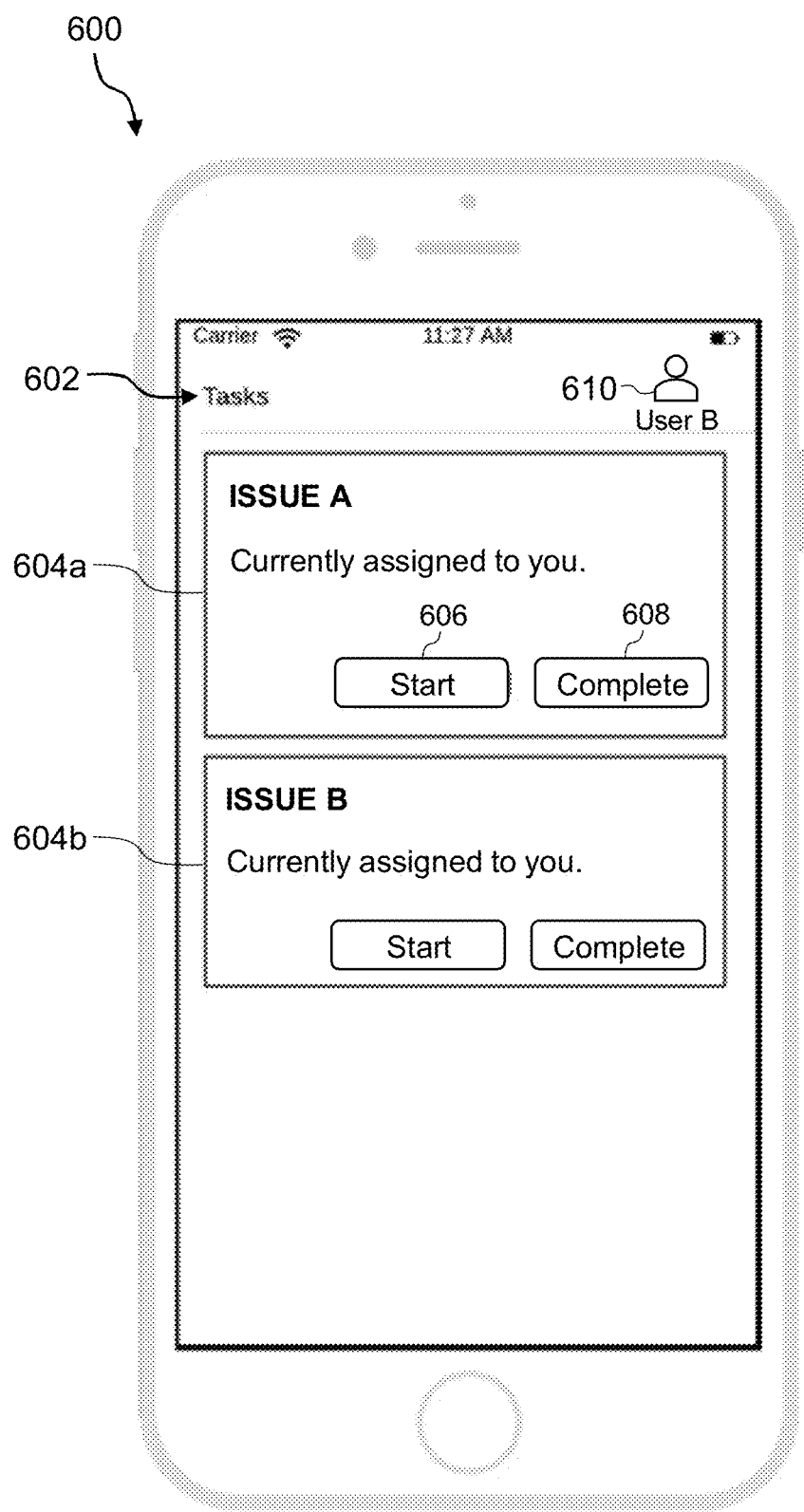

Referring to FIG. 6B, the UI 600 can display an indictor 610 in response to detecting a nearby user device. For example, indicator 610 may appear after an NFC or other P2P link is established with a nearby device. The indicator 600 shows information about the nearby user that can receive tasks shifted using UI 600. That is, instead of having to search for the recipient within a contact list, UI 600 automatically locates and displays information on the nearby target user. The indictor 600 can include, for example, a name of the nearby user (e.g., "User B") and a picture, icon, or other graphic associated with the nearby user. Nearby devices can exchange such user information when the P2P link is established. The nearby user indictor 610 may be removed when the P2P link terminates.

In some embodiments, a user device may be configured detect and exchange user information with multiple nearby devices. In this case, UI 600 may show indicators 610 for multiple nearby users and include controls to allow selecting a particular nearby to shift tasks to. Depending on the number of nearby users, UI 600 may present nearby users in a list or other compact format. In some embodiments, UI 600 may sort or rank the list of near users based the content of tasks currently shown in the UI 600. For example, if a particular nearby user cannot be assigned any of the tasks in the task list 602 (e.g., based on the reassignment validation rules), then UI 600 may display that user less prominently, such as at the end/bottom of the list of nearby users.

In some embodiments, UI 600 may visually indicate which tasks 604 can be transferred to the nearby device according to the task validation rules or task assignability information provided by the server. For example, UI 600 can highlight transferable tasks within the task list 602. As another example, UI 600 can display transferable tasks at or near the top of tasks list 602. That is, tasks list 602 can adjust dynamically in response to detecting particular nearby users.

Figure 6C:
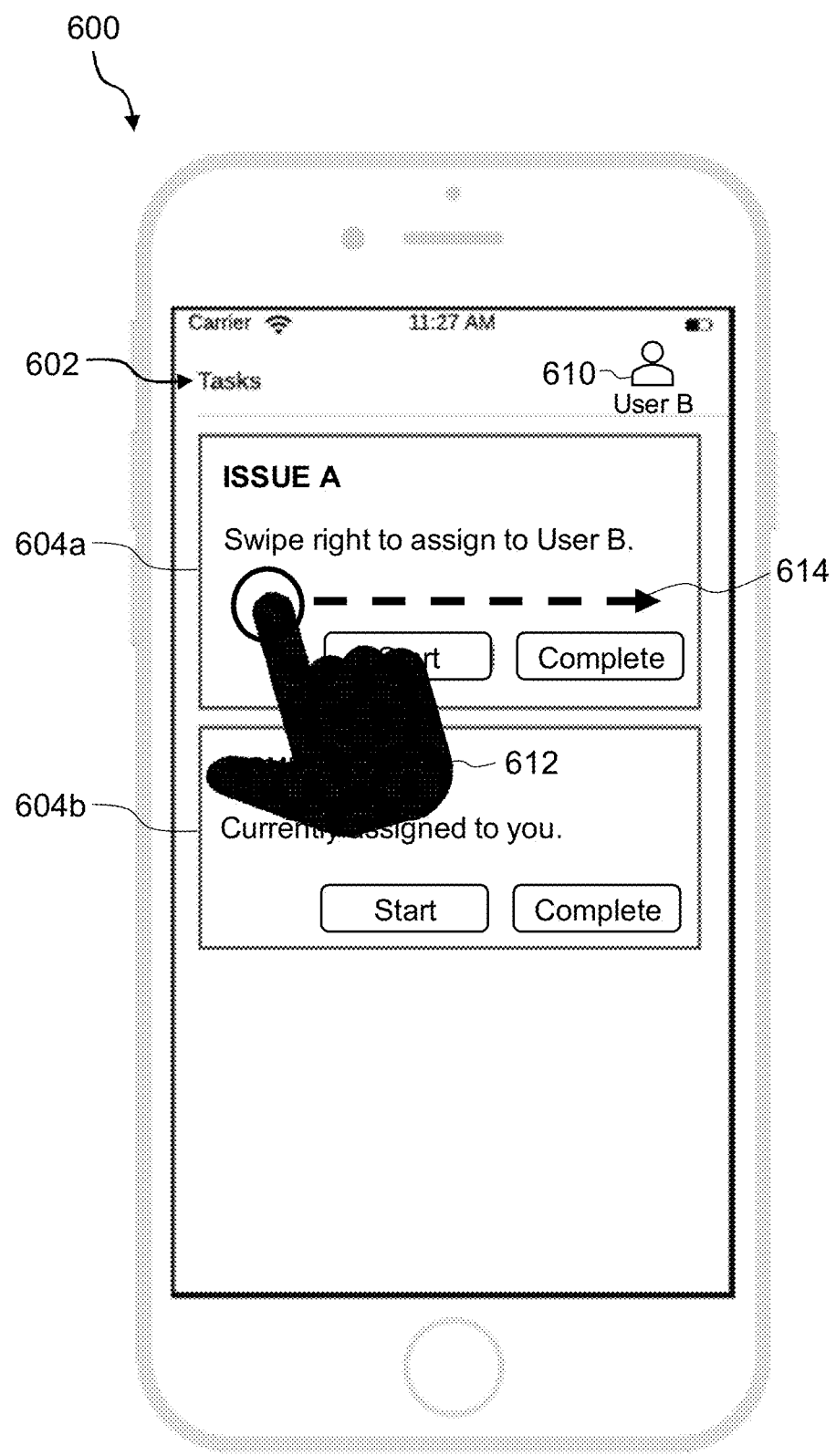

Referring to FIG. 6C, also in response to detecting the nearby device, UI may activate one or more gestures for shifting tasks to the nearby user (i.e., the user shown by indictor 610). For example, first task 604a ("ISSUE A") can be shifted to nearby user ("User B") using a UI gesture, such as by swiping on the task, as shown by arrow 614 in FIG. 6C. In other embodiments, tasks can be shifted using a click, tap, or swipe, or other non-UI gestures, such as a quick movement or turn of the device or contact of devices. In response to receiving user input to shift the task 604a, metadata for the task 604a can be transmitted to the nearby device via the P2P link. The metadata may include sufficient information to allow the nearby device to displayed the task 604a in a similar manner as it was displayed by UI 600. As with indictor 610, the task shifting gestures 614 can be deactivated or otherwise removed when the P2P link terminates (e.g., the other device moves out of range to connect via P2P connection with the device). Thus, the illustrative UI 600 dynamically changes in response to nearby devices.

In some embodiments, the user device may identify related tasks in the task list 602 and may prompt if the user would like to transfer related tasks in response to shifting a first task. Identification of related tasks may be based on task descriptions, task groups, etc.

Figure 6D:
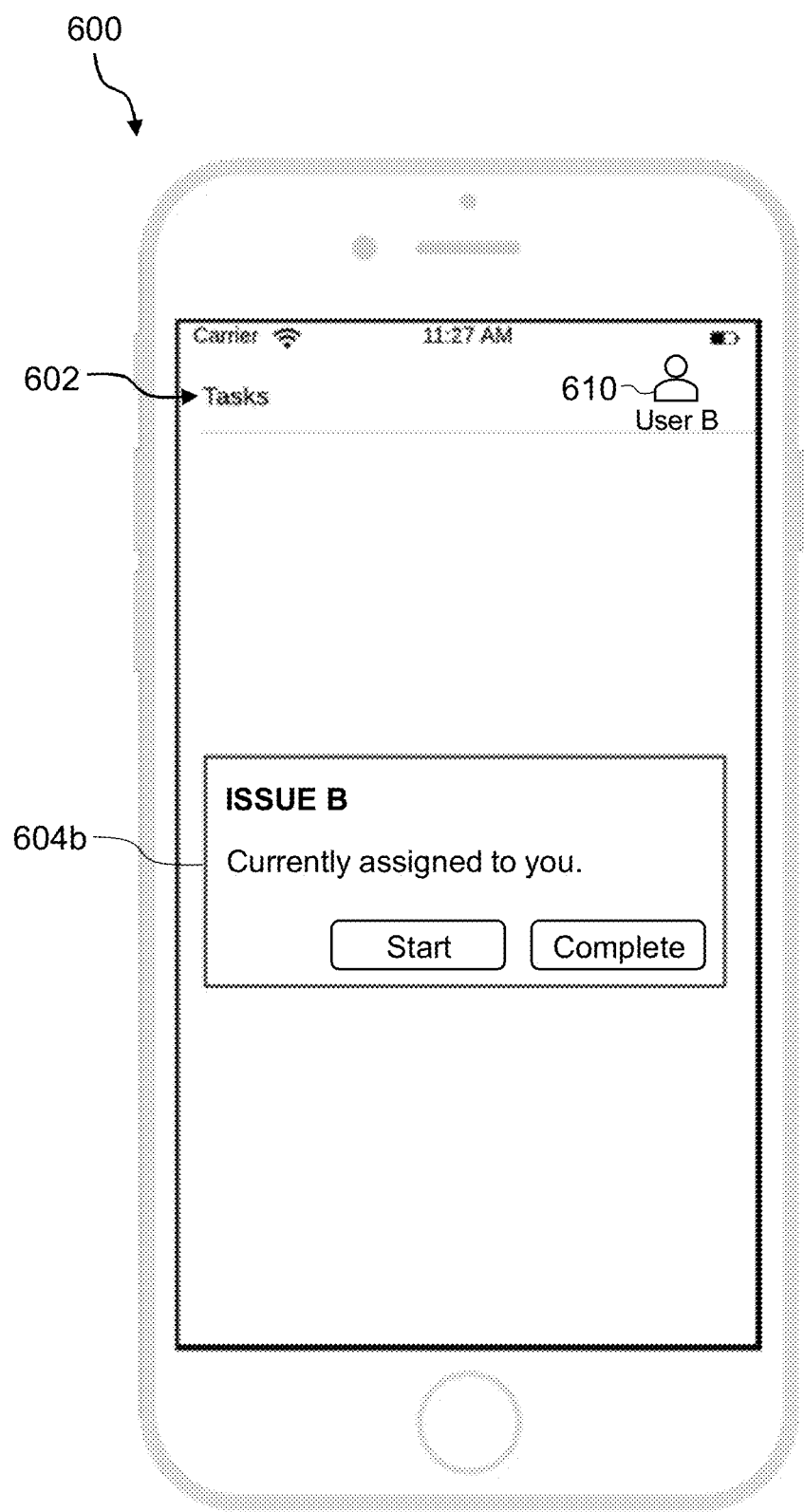

Referring to FIG. 6D, after a task has been shifted to a nearby device, it can be removed from the task list 602. In the example shown, first task 604a has been removed from the task list 602, leaving only second task 604b. It should be appreciated that a UI provided within a task-based app can include various other features and functions that, for clarity, are not shown in FIGS. 6A-6D.

Figure 7A:
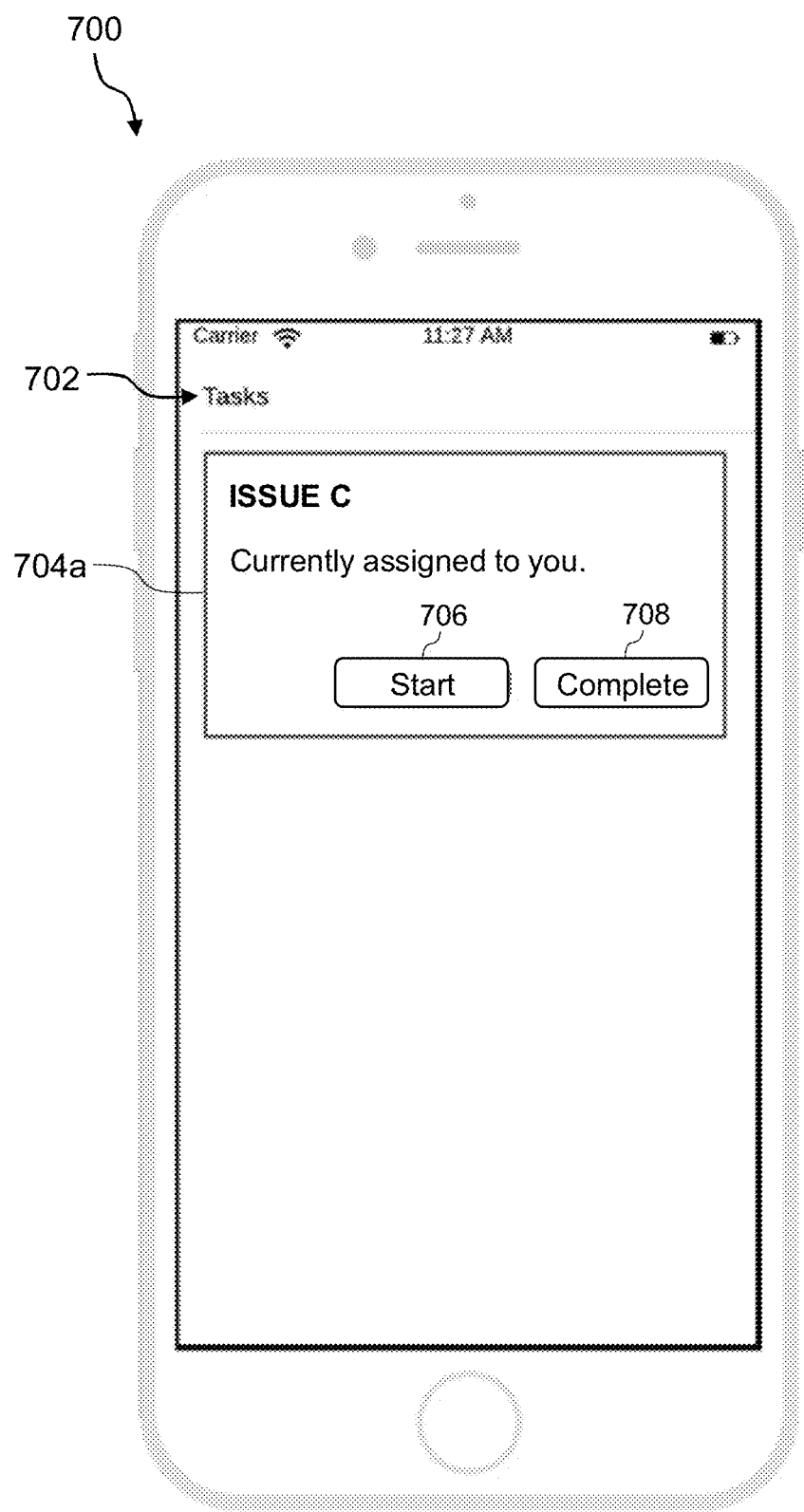
FIGS. 7A-7C show an illustrative user interface for receiving shifted tasks from a computing device, in accordance with some embodiments of the present disclosure.
Figure 7B:
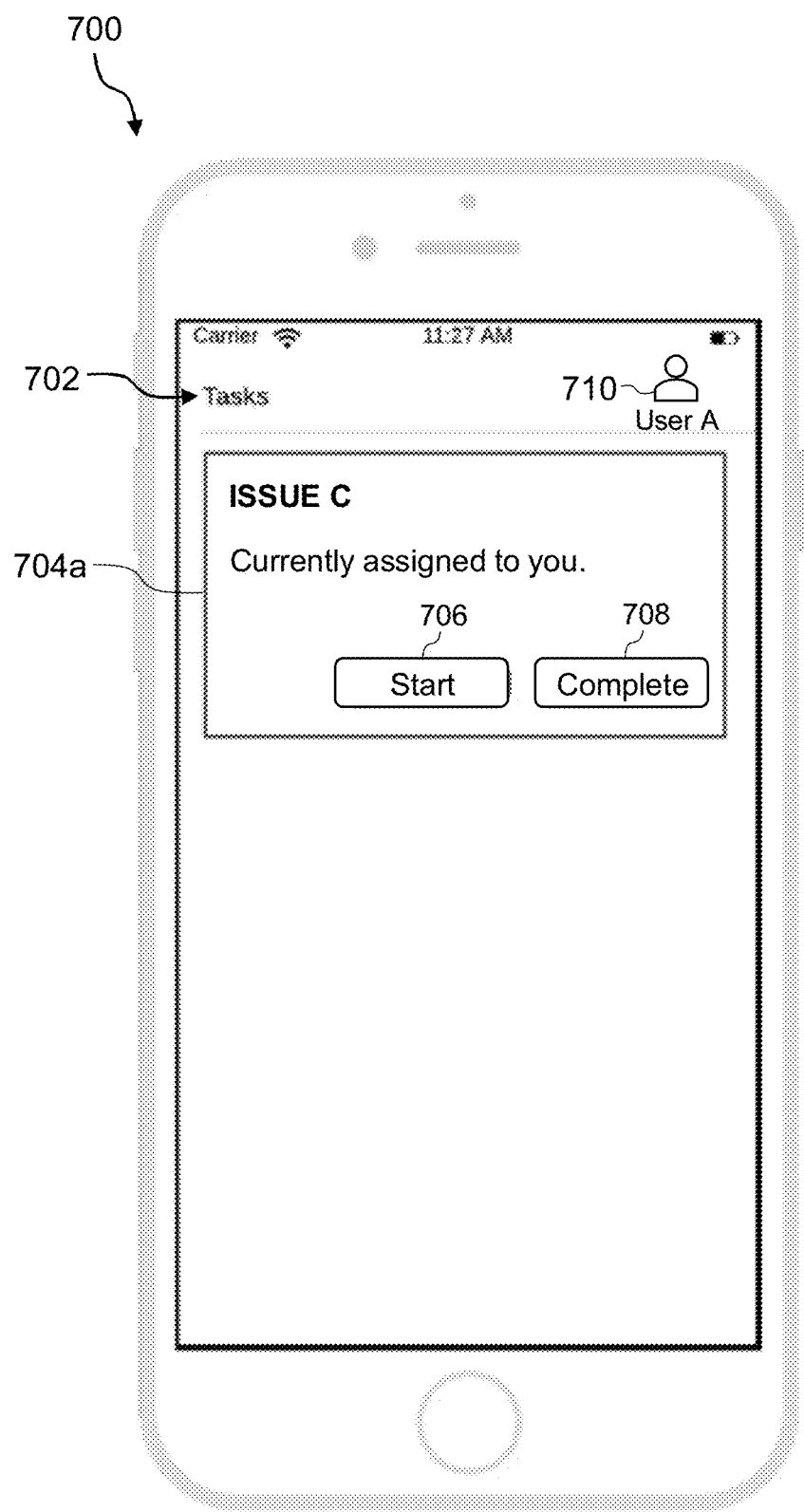
Figure 7C:
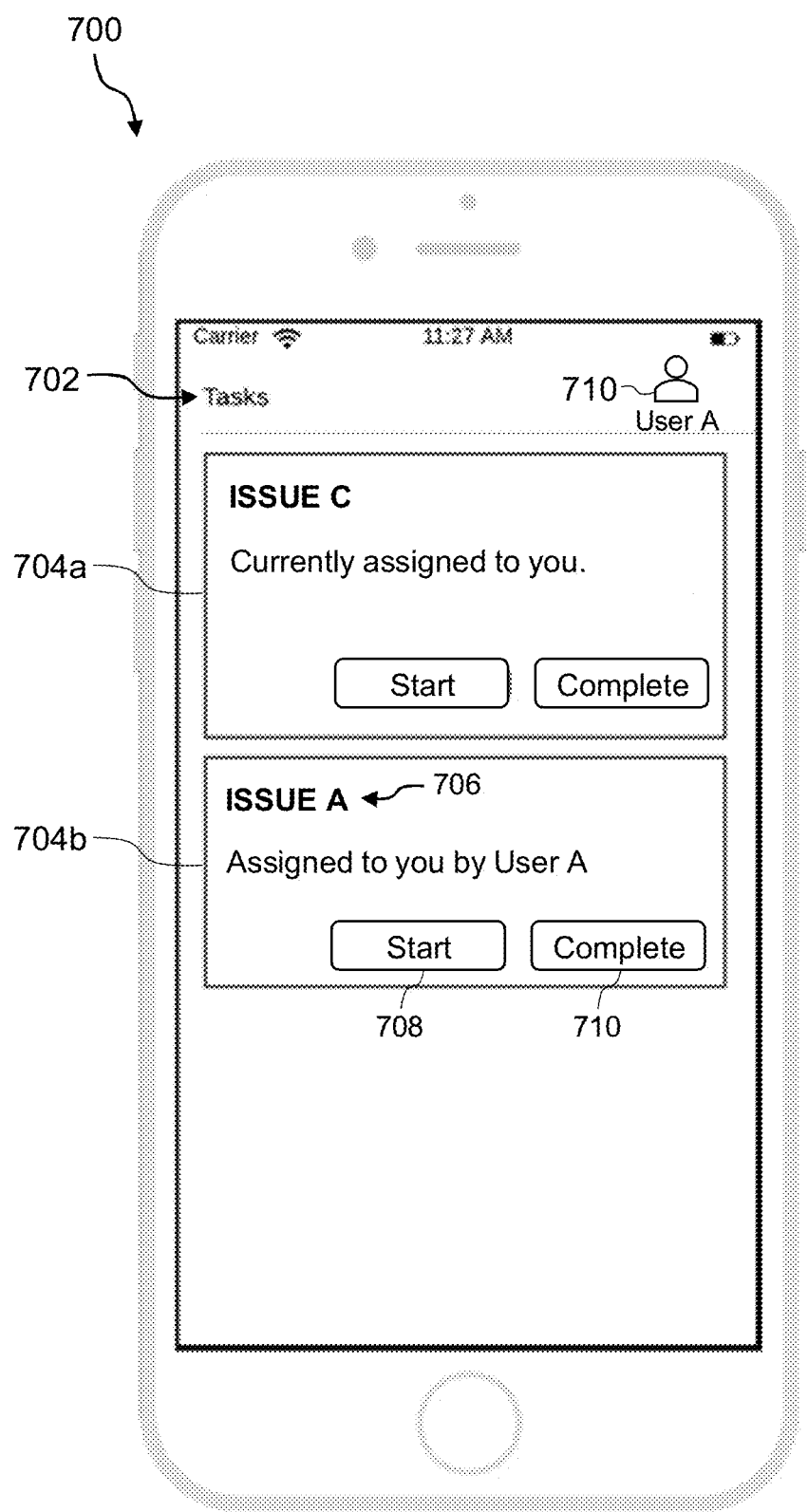

FIGS. 7A-7C show an illustrative UI 700 for receiving a shifted task from a nearby computing device, in accordance with some embodiments of the present disclosure. The UI 700 can be implemented within a task-based app executable on a user device, such as app 504 of FIG. 5. In more detail, UI 700 may be presented by second user device 502b when receiving a task from nearby, first user device 506a.

Referring to FIG. 7A, the UI 700 can include a task list 702 having one or more tasks, with one task 704a shown in the figure. Task list 702 may be initially populated using data received from one or more server devices, such as server device 520 of FIG. 5. For example, the server 520 may return data for one or more tasks currently assigned to the device 502*a* shown in FIG. 6A.

Referring to FIG. 7B, the UI 700 can display an indictor 710 in response to detecting a nearby user device. Here, the indicator 710 shows that "User A" is nearby (e.g., within P2P communication of the shown device.

FIG. 7C shows a second task 704*b* added to the task list 702. The second task 704*b* may have been shifted by the nearby device ("User A") by sending metadata for the task via a P2P link. For example, task 704*b* of FIG. 7C may be the same as task 604*a* in FIG. 6C. Using the received metadata, UI 700 can display the task in its task list and indicate that the task has been reassigned ("Assigned to you by User A"). That is, task 704*b* can be rendered in UI 700 using only the P2P-transferred metadata and without waiting for the server to send data for the task 704*a*. For example, the metadata can include a task title 706, a task description (not shown), a list of actions that can be performed on the task (e.g., actions corresponding to buttons 708 and 710), and a task id (not shown). It should be understood that other information can be displayed for a shifted task and that the information shown in FIG. 7C is merely illustrative. For example, in embodiments where task list 702 includes tasks from one more different microapps, the task's app name and app icon may be included in the metadata and displayed by UI 700.

In some embodiments, the task list 702 may be ordered or ranked by task priority. In this case, task list 702 may be re-ordered based on priority and in response to a newly received task so that higher priority tasked are position at the top of the list. For example, referring to FIG. 7C, new task 704*b* may be displayed above existing task 704*a* if it has a higher priority.

As previously discussed, if the user performs an action on the shifted task 704*b* before the task is confirmed by the server, the actions may be recorded and replayed after such confirmation is received. For example, if the user clicks/taps button 708 to "Start" the task, execution of this action may be delayed until after notification of the task reassignment is received from the server.

Figure 8:
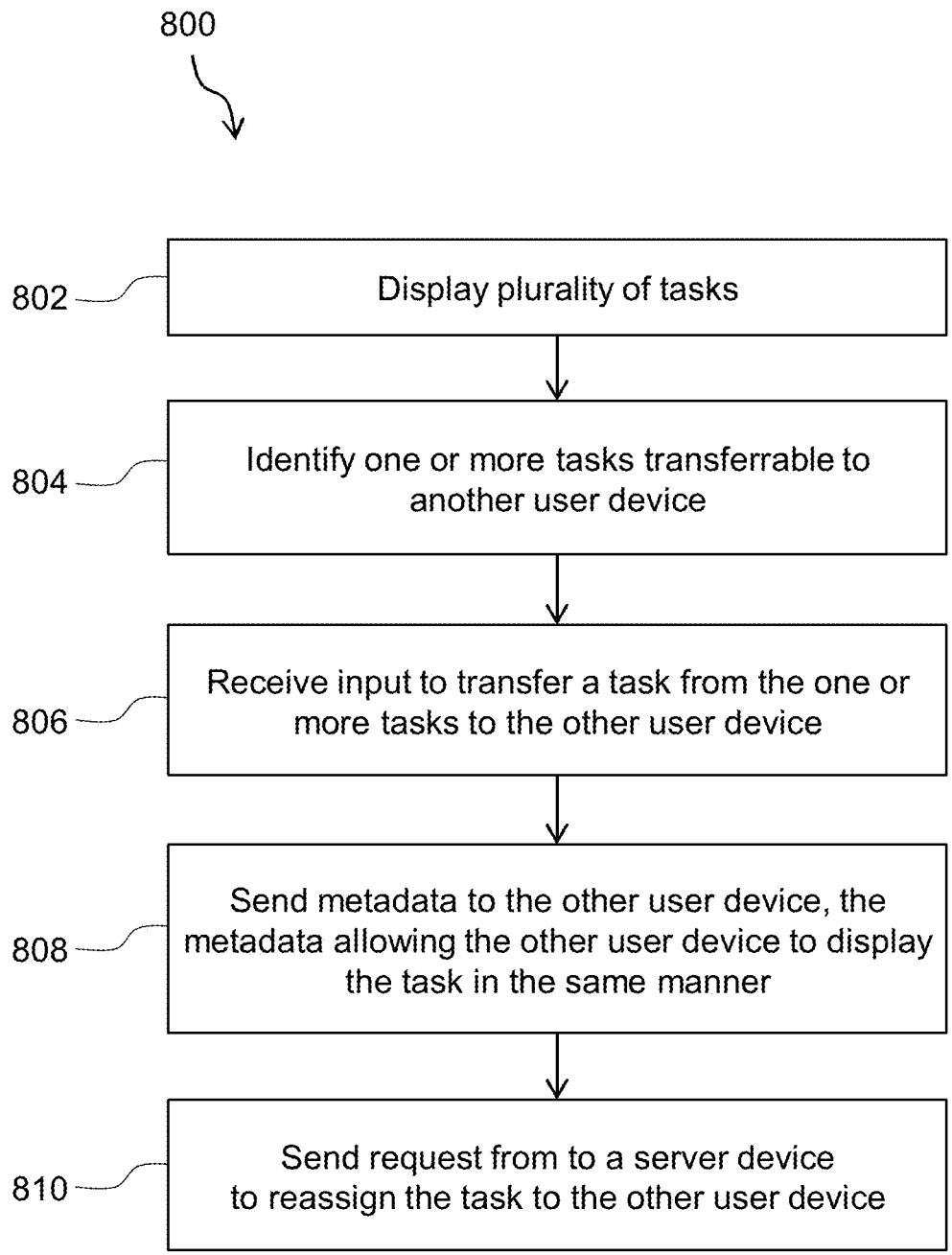
FIG. 8 is a flow diagram showing an illustrative method for shifting tasks to another computing device, in accordance with some embodiments of the present disclosure.

FIG. 8 shows an illustrative method 800 for shifting tasks to a nearby computing device, in accordance with some embodiments of the present disclosure. The method 800 can be implemented within a user device, such as user device 502*a* of FIG. 5. In particular, method 800 can be implemented within tasks module 506 of FIG. 5.

At block 802, a plurality of tasks can be displayed on the user device. The tasks may be presented as a list similar to task list 602 of FIG. 6A.

At block 804, one or more tasks that can be transferred to another user device (e.g., a nearby user device) are identified. The two user devices may be communication via a P2P link such as an NFC link or a 5G D2D link. In some embodiments, the transferable tasks can be identified using information about the user of the other user device, such as the user's role within an organization and which task groups the user is assed to. In some embodiments, the transferable tasks can be identified based on which apps are available on the other user device. The user devices may exchange user information and/or available app information via the P2P link. As discussed above in the context of FIG. 6B, the transferable tasks may be highlighted or otherwise displayed more prominently than non-transferable tasks.

At block 806, input can be received to transfer or shift a task, from the one or more identified tasks, to the other user device. In some embodiments, the input can include a UI gesture, such as a swipe on the displayed task. At block 808, in response to the input, the user device can send metadata to the other user device. The metadata allows the other user device to display the task in the same manner as the task was displayed by the sending device (e.g., in the same manner as it was displayed at block 802). Examples of metadata that can be sent are provided above in the context of FIG. 5.

At block 810, the user device can send a request to a server device, requesting that the task be transferred or reassigned to the other device (or to the user of the other device). In some embodiments, sending the request to the server device may be intentionally delayed until after the task is shifted directly to the other device via the P2P link.

Figure 9:
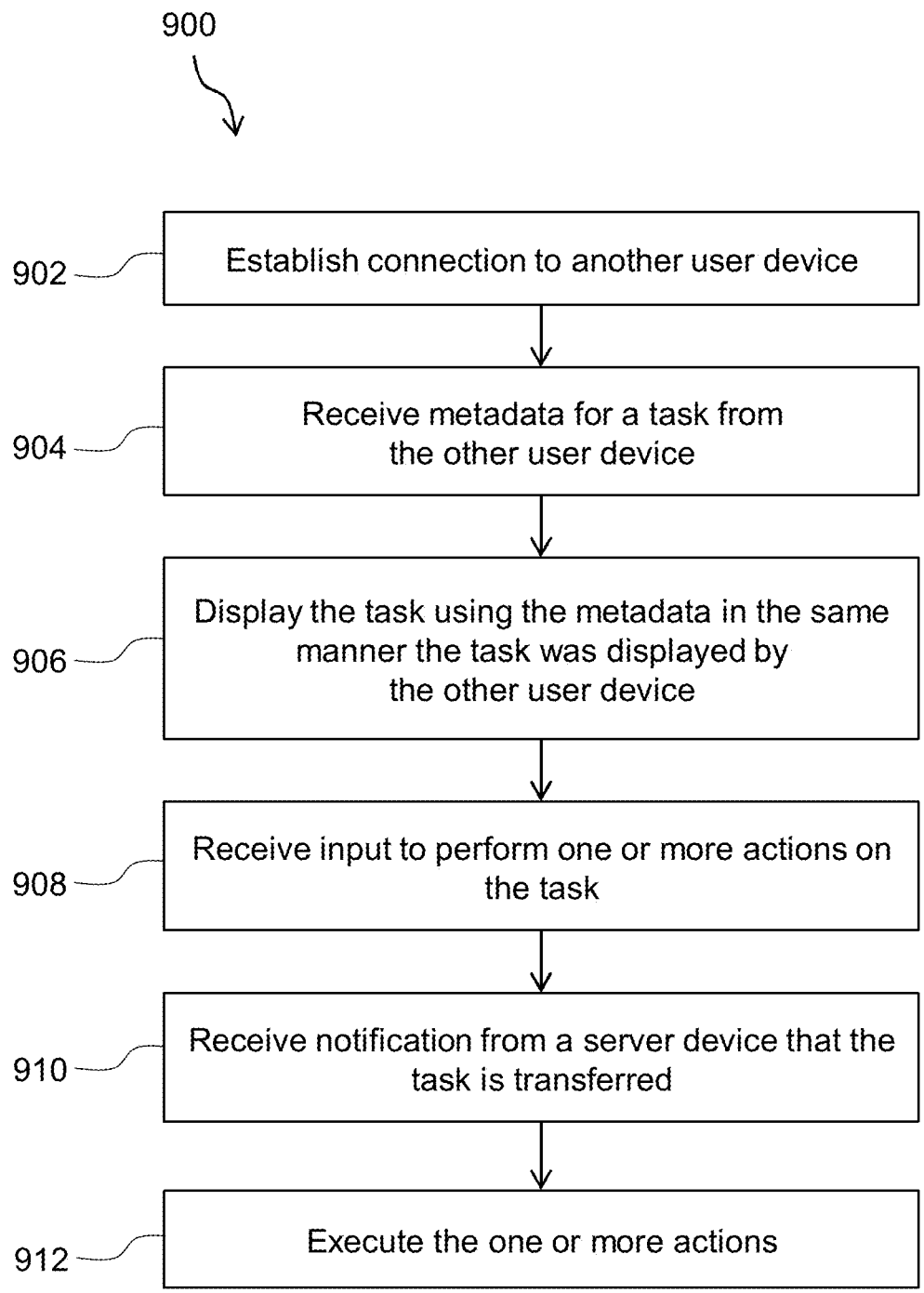
FIG. 9 is a flow diagram showing an illustrative method for receiving shifted tasks from a computing device, in accordance with some embodiments of the present disclosure.

FIG. 9 shows an illustrative method 900 for receiving shifted tasks from another computing device, in accordance with some embodiments of the present disclosure. The method 900 can be implemented within a user device, such as user device 502*b* of FIG. 5. In particular, method 900 can be implemented within tasks module 506 of FIG. 5.

At block 902, the user device can establish a connection with another user device (e.g., a nearby device). In some embodiments, the connection can include a P2P link such as an NFC link or a 5G D2D link. At block 904, the user device can receive metadata for a task from the other device. The metadata can allow the user device to display the task in the same manner as the first task was displayed by the other device. Examples of metadata that can be received are provided above in the context of FIG. 5. In some embodiments, the metadata can include a list of actions that can be performed on the task. At block 906, the user device can display the transferred task using the received metadata. In some embodiments, this can include displaying buttons or other UI controls corresponding to the actions in the list of actions. In some embodiments, the user device can add to transferred task to its displayed task list, such as task list 702 in FIG. 7C.

At block 908, the user device can receive input to perform one or more actions of the task. This can include, for example, detecting that a user clicked a button to "Start" the task, to "Complete" the task, etc. In some embodiments, the user device may record information about the actions to storage rather than executing them immediately. At block 910, the user device can receive a notification from a server device that the task has been transferred. That is, the user device can receive confirmation that the transfer is valid and effective. At block 912, in response to receiving such notification/confirmation, the user device can execute, or "replay," the recorded actions (i.e., the actions recorded at block 908).

The following examples pertain to further embodiments, from which numerous permutations and configurations will be apparent.

Example 1 includes a method including: displaying, on a first client device, a plurality of tasks; identifying, by the first client device, a task from the plurality of tasks, the task transferrable to a second client device in communication with the first client device; and sending, by the first client device, metadata for the task to the second client device in response to input received by the first client device, the metadata allowing the second client device to display the task in the same manner as the task was displayed by the first client device.

Example 2 includes the subject matter of Example 1, further including sending, from the first client device to a server device, a request to transfer the task to the second client device.

Example 3 includes the subject matter of Example 2, wherein the first client device delays the sending of the request to the server until after the metadata is sent to the second client device.

Example 4 includes the subject matter of any of Examples 1 through 3, further including receiving, by the first client device, user information from the second client device.

Example 5 includes the subject matter of Example 4, further including displaying, by the first client device, a nearby user indicator using the received user information.

Example 6 includes the subject matter of Example 4 or 5, wherein the received user information includes one or more task groups to which a user of the second client device is assigned, wherein the identification of the task from the plurality of tasks includes determining that the task is assigned to at least one of the one or more task groups to which the user of the second client device is assigned.

Example 7 includes the subject matter of any of Examples 4 through 6, wherein the received user information includes a role of a user of the second client device, wherein the identification of the task from the plurality of tasks includes determining a role of a user of the first client device; and determining that users having the role of the user of the first client device can assign tasks to users having the role of the user of the second client device.

Example 8 includes the subject matter of any of Examples 4 through 7, further including receiving, by the first client device, a list of applications available on the second client device, wherein the identification of the task from the plurality of tasks includes determining that the task is associated with an application included with the list of applications available on the second client device.

Example 9 includes the subject matter of any of Examples 1 through 8, wherein the first client device and the second client device are in communication via a near-field communication (NFC) link or a 5G Device-to-Device (D2D) link.

Example 10 includes a method including: establishing, by a second client device, a connection to a first client device, the connection enables the first client device to be in direct communication with the second client device; receiving, by the second client device, metadata from the first client device, the metadata allowing the second client device to display the task in the same manner as the task was displayed by the first client device; and displaying, by the second client device, the task in a task list using the received metadata.

Example 11 includes the subject matter of Example 10, further including: receiving, by the second client device, input to perform one or more actions of the task; and recording, by the second client device, information about the one or more actions to storage.

Example 12 includes the subject matter of Example 11, further including: receiving, by the second client device, notification from a server device, the notification configured to authorize transfer of the task from first client device to the second client device; and in response to the reception of the notification, executing the one or more actions from the storage on the second client device.

Example 13 includes the subject matter of any of Examples 10 through 12, wherein the connection includes a near-field communication (NFC) link or a 5G Device-to-Device (D2D) link.

Example 14 includes an apparatus for use within a first client device, the apparatus comprising a processor and a non-volatile memory storing computer program code. The code, when executed on the processor, causes the processor to execute a process operable to: display a plurality of tasks; identify a task from the plurality of tasks that can be transferred to a second client device in communication with the first client device; and send a first request to the second client device to transfer the task to the second client device in response to input received by the first client device, the request including metadata to allow the second client device to display the task in the same manner as the task was displayed by the first client device.

Example 15 includes the subject matter of Example 14, wherein the process is further operable to send, to a server device, a second request to transfer the task to the second client device.

Example 16 includes the subject matter of Example 15, wherein the sending of the second request is delayed until after the first request is sent to the second client device.

Example 17 includes the subject matter of any of Examples 14 through 16, wherein the process is further operable to receive user information from the second client device.

Example 18 includes the subject matter of Example 17, wherein the process is further operable to display a nearby user indicator using the received user information.

Example 19 includes the subject matter of Example 17 or 18, wherein the received user information includes one or more task groups to which a user of the second client device is assigned, wherein the identification of the task from the plurality of tasks includes determining that the task is assigned to at least one of the one or more task groups to which the user of the second client device is assigned.

Example 20 includes the subject matter of any of Examples 17 through 19, wherein the received user information includes a role of a user of the second client device, wherein the identification of the task from the plurality of tasks includes: determining a role of a user of the first client device; and determining that users having the role of the user of the first client device can assign tasks to users having the role of the user of the second client device.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method comprising:
displaying, on a first client device, a plurality of tasks;
identifying, by the first client device, a task from the plurality of tasks, the task transferrable to a second client device in communication with the first client device; and
sending, by the first client device, metadata for the task to the second client device in response to input received by the first client device, the metadata allowing the second client device to display the same information about the task as was displayed by the first client device, the metadata sent using a direct connection between the first client device and the second client device;
sending, from the first client device to a server device using a different connection, a request to transfer the task to the second client device also in response to the input received by the first client device, wherein the sending of the request to the server device to transfer the task to the second client device is performed after the sending of the metadata for the task to the second client device; and
the second client device configured to receive an input from a user to perform one or more actions of the task after the task has been transferred from the server device to the second client device.

2. The method of claim 1, wherein the first client device delays the sending of the request to the server until after the metadata is sent to the second client device.

3. The method of claim 1, further including:
receiving, by the first client device, user information from the second client device.

4. The method of claim 3, further including:
displaying, by the first client device, a nearby user indicator using the received user information.

5. The method of claim 3, wherein the received user information includes one or more task groups to which a user of the second client device is assigned, wherein the identification of the task from the plurality of tasks includes:
determining that the task is assigned to at least one of the one or more task groups to which the user of the second client device is assigned.

6. The method of claim 3, wherein the received user information includes a role of a user of the second client device, wherein the identification of the task from the plurality of tasks includes:
determining a role of a user of the first client device; and
determining that users having the role of the user of the first client device can assign tasks to users having the role of the user of the second client device.

7. The method of claim 3, further including receiving, by the first client device, a list of applications available on the second client device, wherein the identification of the task from the plurality of tasks includes:
determining that the task is associated with an application included with the list of applications available on the second client device.

8. The method of claim 1, wherein the first client device and the second client device are in communication via a near-field communication (NFC) link or a 5G Device-to-Device (D2D) link.

9. A method comprising:
establishing, by a second client device, a connection to a first client device, the connection enables the first client device to be in direct communication with the second client device;
receiving, by the second client device, metadata from the first client device, the metadata allowing the second client device to display the same information about the task as was displayed by the first client device, the first client device configured to send the metadata in response to input received by the first client device and further configured to send a request, using a different connection, to a server device to transfer the task to the second client device also in response to the input received by the first client device, wherein the first client device is configured to send the request to the server device to transfer the task to the second client device after sending the metadata to the second client device;

displaying, by the second client device, the task in a task list using the received metadata; and
receiving, by the second client device, an input from a user to perform one or more actions of the displayed task.

10. The method of claim 9, further including:
receiving, by the second client device, input to perform one or more actions of the task; and recording, by the second client device, information about the one or more actions to storage.

11. The method of claim 10, further including:
receiving, by the second client device, notification from a server device, the notification configured to authorize transfer of the task from first client device to the second client device; and
in response to the reception of the notification, executing the one or more actions from the storage on the second client device.

12. The method of claim 9, wherein the connection includes a near-field communication (NFC) link or a 5G Device-to-Device (D2D) link.

13. An apparatus for use within a first client device, the apparatus comprising:
a processor; and
a non-volatile memory storing computer program code that when executed on the processor causes the processor to execute a process operable to:
display a plurality of tasks;
identify a task from the plurality of tasks that can be transferred to a second client device in communication with the first client device;
send a first request to the second client device to transfer the task to the second client device in response to input received by the first client device, the request including metadata to allow the second client device to display the same information about the task as was displayed by the first client device, the first request sent using a direct connection between the first client device and the second client device; and
send, to a server device, a second request to transfer the task to the second client device also in response to the input received by the first client device.

14. The apparatus of claim 13, wherein the sending of the second request is delayed until after the first request is sent to the second client device.

15. The apparatus of claim 13, wherein the process is further operable to: receive user information from the second client device.

16. The apparatus of claim 15, wherein the process is further operable to:
display a nearby user indicator using the received user information.

17. The apparatus of claim 15, wherein the received user information includes one or more task groups to which a user of the second client device is assigned, wherein the identification of the task from the plurality of tasks includes:
determining that the task is assigned to at least one of the one or more task groups to which the user of the second client device is assigned.

18. The apparatus of claim 15, wherein the received user information includes a role of a user of the second client device, wherein the identification of the task from the plurality of tasks includes:
determining a role of a user of the first client device; and
determining that users having the role of the user of the first client device can assign tasks to users having the role of the user of the second client device.

* * * * *